United States Patent
Su et al.

(10) Patent No.: US 10,432,946 B2
(45) Date of Patent: Oct. 1, 2019

(54) DE-JUDDERING TECHNIQUES FOR CODED VIDEO

(71) Applicant: Apple Inc., Cupertino, CA (US)

(72) Inventors: Yeping Su, Sunnyvale, CA (US); Chris Y. Chung, Sunnyvale, CA (US); Hsi-Jung Wu, San Jose, CA (US); Xiaosong Zhou, Campbell, CA (US); Jiefu Zhai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 14/964,965

(22) Filed: Dec. 10, 2015

(65) Prior Publication Data

US 2016/0182911 A1    Jun. 23, 2016

Related U.S. Application Data

(60) Provisional application No. 62/095,989, filed on Dec. 23, 2014.

(51) Int. Cl.

| | |
|---|---|
| *H04N 7/12* | (2006.01) |
| *H04N 19/154* | (2014.01) |
| *H04N 19/115* | (2014.01) |
| *H04N 19/137* | (2014.01) |
| *H04N 19/187* | (2014.01) |
| *H04N 19/177* | (2014.01) |

(Continued)

(52) U.S. Cl.
CPC ......... *H04N 19/154* (2014.11); *H04N 7/0127* (2013.01); *H04N 19/115* (2014.11); *H04N 19/117* (2014.11); *H04N 19/137* (2014.11); *H04N 19/177* (2014.11); *H04N 19/187* (2014.11); *H04N 19/31* (2014.11); *H04N 19/587* (2014.11); *H04N 19/46* (2014.11); *H04N 19/85* (2014.11)

(58) Field of Classification Search
CPC .... H04N 19/154; H04N 19/587; H04N 19/31; H04N 19/117; H04N 7/0127; H04N 19/115; H04N 19/177; H04N 19/187; H04N 19/137; H04N 19/85; H04N 19/46
See application file for complete search history.

(56) References Cited

U.S. PATENT DOCUMENTS

| | | | |
|---|---|---|---|
| 8,312,499 B2 | 11/2012 | Linzer et al. | |
| 8,908,774 B2 | 12/2014 | Yu | |

(Continued)

*Primary Examiner* — Richard T Torrente
(74) *Attorney, Agent, or Firm* — BakerHostetler

(57) ABSTRACT

Judder artifacts are remedied in video coding system by employing frame rate conversion at an encoder. A source video sequence may be coded as base layer coded video at a first frame rate. An encoder may identify a portion of the coded video sequence that likely will exhibit judder effects when decoded. For those portions that likely will exhibit judder effects, video data representing the portion of the source video may be coded at a higher frame rate than a frame rate of the coded base layer data as enhancement layer data. Moreover, an encoder may generate metadata representing "FRC hints"—techniques that a decoder should employ when performing decoder-side frame rate conversion. An encoding terminal may transmit the base layer coded video and either the enhancement layer coded video or the FRC hints to a decoder. Thus, encoder infrastructure may mitigate against judder artifacts that may arise during decoding.

24 Claims, 4 Drawing Sheets

(51) Int. Cl.
*H04N 7/01* (2006.01)
*H04N 19/117* (2014.01)
*H04N 19/31* (2014.01)
*H04N 19/587* (2014.01)
*H04N 19/46* (2014.01)
*H04N 19/85* (2014.01)

(56) References Cited

U.S. PATENT DOCUMENTS

| | | | |
|---|---|---|---|
| 2003/0169933 A1* | 9/2003 | Song | H04N 19/139 382/239 |
| 2006/0002465 A1* | 1/2006 | Raveendran | H04N 19/176 375/240.01 |
| 2006/0165176 A1* | 7/2006 | Raveendran | H04N 19/139 375/240.16 |
| 2007/0086666 A1 | 4/2007 | Bruls | |
| 2011/0080951 A1* | 4/2011 | Komatsu | H04N 19/159 375/240.12 |
| 2014/0168366 A1* | 6/2014 | Ichiki | H04N 19/597 348/43 |

* cited by examiner

100

200

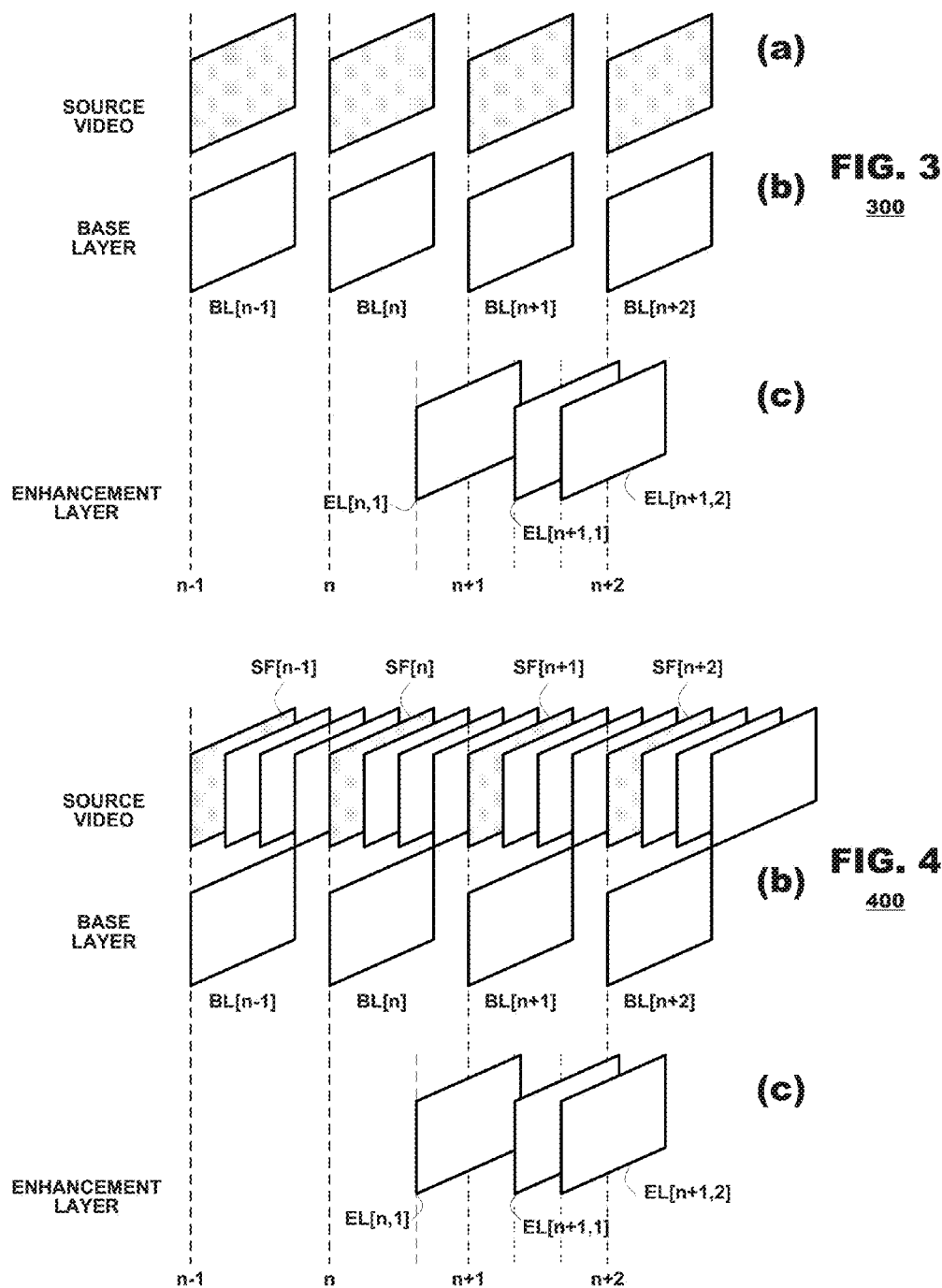

500

600

DE-JUDDERING TECHNIQUES FOR CODED VIDEO

CLAIM FOR PRIORITY

The present disclosure benefits from priority of U.S. patent application 62/095,989, entitled "De-Juddering Techniques" and filed Dec. 23, 2014, the disclosure of which is incorporated herein in its entirety.

BACKGROUND

The present disclosure relates to video coding techniques.

Video distribution systems include a video source and at least one receiving device. The video content may be distributed over a network, such as broadcast television, Over The Top (OTT) delivery, Internet Protocol Television (IPTV), etc., or over fixed media, such as Blu-ray, DVDs, etc. Conventionally, movie content is provided at 24 frames per second (fps).

Recent advances in video capture and display technology, however, have opened the door for the use of more sophisticated content, including content characterized as High Dynamic Range (HDR). High Dynamic Range content is essentially characterized by an increased dynamic range, which is described as the ratio between the largest and smallest possible values that are represented in the signal.

However, as quality in video data increases, the "judder effect," or artifacts made visible due to the relatively slow transition between frames, also increases. Although the judder effect is worse on certain types of video content, for example, slow consistent panning motion or video with a vertical edge (which may appear to jump from frame to frame), generally all video is treated equally by the decoder. Conventionally, after decoding compressed video, but before display, a frame rate converter (FRC) will increase the number of images per second in a video sequence by temporally interpolating additional frames for the video sequence. Video distribution systems, however, often use lossy video compression techniques to exchange video between terminals, which can include loss of image content. FRC itself may induce artifacts in processing which may be pronounced in such a system.

Therefore, the inventors perceived a need in the art for an improved processing of video data to enhance the display quality of video data captured at low frame rates in video distribution systems.

BRIEF DESCRIPTION OF THE DRAWINGS

FIGS. 3 and 4 illustrate exemplary sequences of source video, base layer data and enhancement layer coded video, according to embodiments of the present disclosure.

DETAILED DESCRIPTION

Embodiments of the present disclosure provide techniques for coding a source video sequence as base layer coded video at a first frame rate, and identifying a portion of the coded video sequence that likely will exhibit judder effects when decoded. For those portions that likely will exhibit judder effects, video data representing the portion of the source video at a higher frame rate than a frame rate of the coded base layer data may be coded as enhancement layer data. Thus, encoder infrastructure may mitigate against judder artifacts that may arise during decoding.

Figure 1:
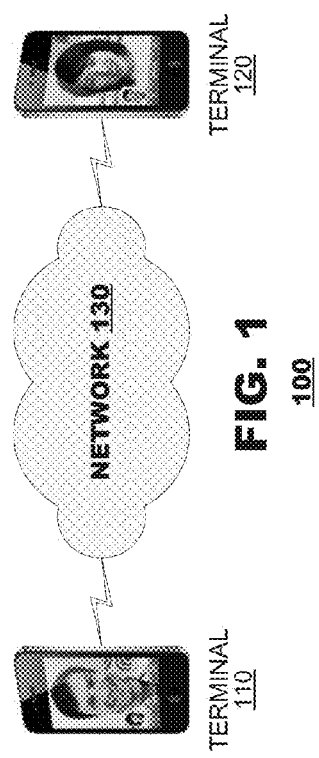
FIG. 1 is a simplified block diagram of an encoder/decoder system according to an embodiment of the present disclosure.

FIG. 1 is a simplified block diagram of an encoder/decoder system 100 according to an embodiment of the present disclosure. The system 100 may include first and second terminals 110, 120 interconnected via a network 130. The terminals 110, 120 may exchange coded video with each other via the network 130, either in a unidirectional or bidirectional exchange. The coding may alter a source video sequence into a coded representation that has a smaller bit rate than does the source video and, thereby achieve data compression. The video sequence may constitute a plurality of frames representing a time-ordered sequence of images. The coded video may be decoded, which inverts the coding processes to generate a replica of the source video. Typically, the coding and decoding may conform to processes and syntaxes defined in a video coding protocol, such as MPEG-4, H.263, H.264 and/or HEVC.

For unidirectional exchange, a first terminal 110 may capture video data from local image content, code it and transmit the coded video data to a second terminal 120. The second terminal 120 may decode the coded video data that it receives and display the decoded video at a local display. For bidirectional exchange, each terminal 110, 120 may capture video data locally, code it and transmit the coded video data to the other terminal. Each terminal 110, 120 also may decode the coded video data that it receives from the counterpart terminal and display it for local viewing.

A terminal (say, terminal 110) may process a video sequence captured from a video source, such as a camera. The camera has a sensor that captures the desired sequence of images but may also include some background noise in the captured analog signal. The camera conventionally will capture video data at a predetermined frame rate, such as 24 or 30 fps. A receiving terminal 120 may include a controller to perform frame rate conversion after the video sequence has been decoded but before the video is displayed. The frame rate conversion may increase the frame rate to 60 fps or some other predetermined frame rate.

Although the terminals 110, 120 are illustrated as smartphones in FIG. 1, they may be provided as a variety of computing platforms, including servers, personal computers, laptop computers, tablet computers, media players and/or dedicated video conferencing equipment. The network 130 represents any number of networks that convey coded video data among the terminals 110, 120, including, for example, wireline and/or wireless communication networks. A communication network 130 may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present disclosure unless discussed hereinbelow.

Figure 2:
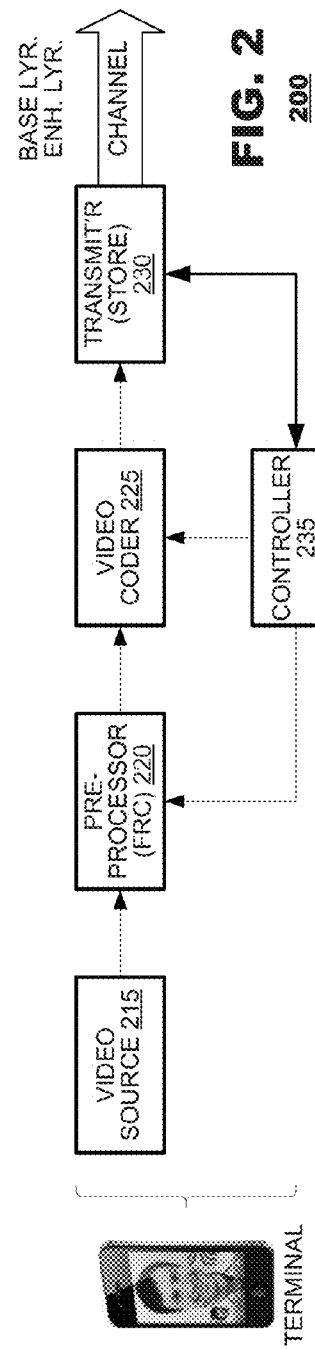
FIG. 2 illustrates a terminal for coding source video according to an embodiment of the present disclosure.

FIG. 2 illustrates a terminal 200 for coding source video according to an embodiment of the present disclosure. The encoding terminal 200 (sometimes called the "source side") may include a video source 215, a pre-processor 220, a video coder 225, and a transmitter 230, all operating under control of a controller 235. The video source 215 may provide a video sequence to the pre-processor 220. The pre-processor

220 may condition the video sequence for coding by the video coder 225. The video coder 225 may perform video coding on video data output from the pre-processor 220 such as by coding the video according to one of the coding protocols mentioned above. The transmitter 230 may transmit coded video data to a channel.

As discussed above, the principles of the present disclosure apply both to unidirectional and bidirectional video coding systems. In a unidirectional coding system, a single terminal 110 (FIG. 1) of a video coding session would include the functionality of FIG. 2. In a bidirectional coding system, each terminal 110, 120 (FIG. 1) of a video coding session would include the functionality of FIG. 2, each operating on independent source video streams. Indeed, the principles of the present disclosure extend to multi-party video coding sessions of three or more terminals where each terminal (not shown) possesses encoding terminal infrastructure as illustrated in FIG. 2.

The video source 215 may be a camera that may include an image sensor to capture an optical image. The sensor interprets the image as an analog signal and an analog-to-digital converter (ADC) may convert the analog signal from the sensor into a digital signal. The digital signal may then be transmitted to a signal processor for additional processing and display. The sensor and ADC may be implemented together as part of the camera as a single application specific integrated circuit (ASIC).

Alternatively, the video source 215 may be represented by a storage device that stores video data authored from other sources (for example, computer graphics or the like). Thus, in certain embodiments, the source video may include synthetically-generated image content authored by an application or other processes that executes on the terminal. Generally, the video sequence will be provided at 24 fps, 30 fps or some other relatively low frame rate.

The pre-processor 220 may receive a sequence of source video data and may perform pre-processing operations that condition the source video for subsequent coding. Video pre-processing may be performed on source video data to render video coding more efficient, for example, by performing video processing operations on video frames such as de-noising filtering, bilateral filtering or other kinds of processing operations that improve efficiency of coding operations performed by the encoding terminal 200. The pre-processor 220 also may perform frame rate conversion, either up conversion or down conversion (decimation), as directed by the controller 235. As part of its operation, the pre-processor 220 may identify characteristics of source video, such as levels of motion within images, the presence of predetermined objects or edges and the like, levels of contrast within images, and variations of dynamic range among content.

The video coder 225 may perform coding operations on the converted video signal to generate a bandwidth-compressed data signal representing the source video. The video coder 225 may perform motion-compensated predictive coding that exploits temporal and spatial redundancies in the video data. For example, the video coder 225 may use content of one or more previously-coded "reference frames" to predict content for a new input frame that has yet to be coded. The video coder 225 may perform motion searches to identify portions of reference frame(s) as a source of prediction, calculate "residual" data representing differences between the predicted data and the source video, and code representations of the residuals along with data identifying prediction modes that were applied.

Typically, the video coder 225 operates on predetermined coding units, called "pixel blocks" herein. That is, an input frame may be parsed into a plurality of pixel blocks—spatial areas of the frame—and prediction operations may be performed for each such pixel block (or, alternatively, for a collection of pixel blocks). The video coder 225 may operate according to any of a number of different coding protocols, including, for example, MPEG-4, H.263, H.264 and/or HEVC. Each protocol defines its own basis for defining pixel blocks and the principles of the present disclosure may be used cooperatively with these approaches.

The video coder 225 may include a local decoder (not shown) that generates decoded video data from the coded video that it generates. The video coder 225 may designate various coded frames from the video sequence to serve as reference frames for use in predicting content of subsequently-coded frames. The local decoder may decode coded data of the reference frames and assemble decoded reference frames therefrom, then store the decoded reference frames in a local decoder picture buffer (DPB) (also not shown). Many predictive coding operations are lossy operations, which cause decoded video data to vary from the source video data in some manner. By decoding the coded reference frames, the video coder 225 may store a copy of the reference frames as they will be recovered by a decoder at a distant terminal 120 (FIG. 1).

The video coder 225 may code video according to a scalable coding protocol. That is, video may be coded in a plurality of layers. A portion of coded video may be assigned to a base layer, which may be decoded by a decoder (not shown) to recover source video at a first level of image quality. The base layer typically generates recovered video at a first image size and/or a first frame rate. Other portion(s) of coded video may be assigned to enhancement layers. The enhancement layers provide video information that supplements the recovered video that can be obtained from decoding of the base layer. Thus, when a decoder jointly decodes base layer data and enhancement layer data, the decoder will obtain a recovered video sequence that has higher image quality and/or frame rate than will be recovered from decoding of the base layer data only.

The transmitter 230 may format the coded video data for transmission to another terminal. Again, the coding protocols typically define a syntax to define characteristics of coded video (such as a frame rate, frame size and other parameters) within a video coding session and also to exchange coded video data once those parameters are defined. The syntax also supports assignments of coded video data to base layers and enhancement layers, respectively. Additionally, the transmitter 230 may package the coded video data into packets or other data constructs as may be required by the network. Once the transmitter 230 packages the coded video data appropriately, it may release the coded video data to the network 130 (FIG. 1).

The controller 235 may manage operation of the pre-processor 220, the video coder 225 and the transmitter 230. The controller 235, for example, may instruct or assist the generation of the desired frame rate (e.g., 60 fps). The controller 235 may manage source side frame rate conversion. It also may determine target bit rates that the video coder 225 must meet with its coded video data, which may be used by the video coder 225 to set coding parameters, such as mode selection, quantizer parameter selection and the like, when coding video data.

In an embodiment, the controller 235 may manage frame rate conversion to reduce judder effects in coded video. The controller 235 may instruct or assist the generation of the desired frame rate (e.g., 60 fps). Frames derived from the source video rather than decoded content will avoid propagating transmission and decode artifacts. Frame rate control may occur through a variety of techniques, which are described below.

To mitigate judder and produce smoother perceived motion for low fps content, FRC may increase the number of images per second in a video sequence via temporal interpolation among frame content. Embodiments of the present disclosure employ FRC at a terminal proximate to a video source before video coder, as discussed below. Such techniques are managed by a controller 235 (FIG. 2) and performed by pre-processors 220 and video coders 225, as discussed below.

In an embodiment, a controller 235 may identify circumstances when judder is likely to arise during a video coding session. The controller 235 may have access to the source video sequence and may perform signal analysis on the source video before adjusting the frame rate of the source video. The controller 235 may do so either by direct analysis of the source video or by analysis of statistics information provided by the pre-processor 220. The severity of perceived motion judder can be analyzed considering several factors, including: 1) the amount of the pixel motion from frame to frame; 2) edge contrast in the direction of motion from frame to frame; 3) display contrast; 4) display dynamic range adaptation; and/or 5) display size and viewing distance that is defined for a video coding session. The controller 235 may estimate, for a base frame rate defined in a video coding session, whether judder likely will occur when a decoder decodes video data which has been coded at a base frame rate (say, 24 fps).

The controller 235 may add frames adaptively to portions of coded data depending on the severity of detected judder in the source sequence. For example, if there is very little motion or no high contrast edges along the direction of motion, the controller 235 may determine that no new frames need be generated and inserted because the judder effect for those frames will be minimal. However, more frames (at a higher frame rate) may be necessary when the controller 235 detects a sequence of frames having high motion or having high contrast edges. Thus, the total frame rate may vary as judder is detected and as frames are added to a coded video sequence in excess of a base coding rate. The added frames may be coded in an enhancement layer, as discussed herein.

When FRC is performed on the source video, coded video data may be represented in a channel data bit stream in a scalable manner, with base-layer data (BL) conveying video at a base frame rate and enhancement-layer data (EL) carrying frames added by FRC:

|  | Frame Position | | | |
| --- | --- | --- | --- | --- |
| Base Layer Data: | BL[n − 1], | BL[n], | BL[n + 1], | BL[n + 2] |
| Enhancement Layer Data: |  | EL[n, 1] | EL[n + 1, 1] EL[n + 1, 2] | |

FIG. 3 illustrates a representative sequence of coded video data that may be carried as base layer-coded video and enhancement-layer coded video, in this example. In FIG. 3, graph (a) may represent a source video sequence, which includes frames of video at times n−1, n, n+1 and n+2, respectively. The base layer coded video is represented in graph (b), which includes coded representations of the source video also at times n−1, n, n+1 and n+2. The enhancement layer coded video, in this example, is represented in graph (c), which includes coded frames at intermediate temporal positions between times n, n+1 and n+2. In FIG. 3, the first frame is given a notation of EL[n,1] to indicate that it appears in a first position between times n and n+1, and the next two frames are given notations EL[n+1,1] and EL[n+1,2] to indicate that those frames appear at respective first and second positions between times n+1 and n+2.

The coded frames of the enhancement layer may be generated by FRC, which involves interpolation of image content at the intermediate temporal positions [n,1], [n+1,1] and [n+1,2] from the source video data that appears at times n, n+1 and n+2. Once the image content is interpolated at those temporal positions, a video coder 225 (FIG. 2) may code the content of those frames using scalable coding techniques.

FIG. 4 illustrates operation that may occur in an alternate embodiment. In this embodiment, a source video sequence provides video at a frame rate that exceeds a base frame rate of a coded video session. For example, the source video may be provided at a frame of 60 fps (or greater), but an encoder and a decoder define a base frame rate of a video coding session at a lower rate, such as 24 fps. In this embodiment, the video encoder may use frame decimation to convert the source video sequence into the lower frame rate that will be used during video coding (e.g., coding from 60 fps to 24 fps). Such frame decimation may involve coding frames from the source video sequence that coincide with temporal positions of the frames needed for the video coding session and, when a temporal position of the base frame rate does not align with a frame in the source video sequence, interpolating frame content at the temporal positions of the base frame rate for use in video coding. Alternatively, such frame decimation may involve pull-down patterns that only include frames from the source video sequence. Other frames from the source video sequence may be discarded. The example of FIG. 4 illustrates source frames SF at positions n−1, n, n+1 and n+2 being selected for coding in the base layer; source frames at other positions would not be selected for coding.

When a controller 235 (FIG. 2) determines that judder is likely to occur from the coded base layer video, the controller 235 may code additional frames of video data in an enhancement layer, as shown in graph 4(c). Again, the enhancement layer may provide additional frames of coded video so that, when a decoder decodes the coded base layer and coded enhancement layer, the higher frame rate mitigates the judder that otherwise would occur from decoding of the base layer video.

FIG. 4, graph (c), illustrates an enhancement layer that contains three frames, EL[n,1], EL[n+1,1] and EL[n+1,2] at intermediate positions between base layer frames BL[n], BL[n+1] and BL[n+2] as illustrated. The controller 235 (FIG. 2) may determine a desired frame rate of decoded video data obtained from decoding the base layer- and enhancement layer-coded video and determine a number of enhancement layer frames that are required to meet the desired frame rate. The controller 235 may generate video data for the enhancement layer, either by selecting source frames that are temporally aligned with the temporal positions of enhancement layer frames or by interpolating frame content at the temporal positions of the enhancement layer frames from source frames that are adjacent to those frames. Then, the controller 235 may cause the video coder 225 to code the enhancement layer frames according to scalable coding techniques.

In another embodiment, a video coder 225 (FIG. 2) may code a base layer from original source video independently, without use of any frames interpolated by FRC processes. In this embodiment, the base layer is guaranteed to avoid insertion of interpolation artifacts into the encoded base layer data.

A controller 235 (FIG. 2) may vary adaptively the number and rate of enhancement layers based on a severity of judder detected in the coded base layer data. If there is very little motion or no high contrast edges along the direction of motion, the controller 235 may determine that no enhancement layer frames are to be inserted. Otherwise, the controller 235 may determine that more enhancement layer frames are to be inserted. The severity of perceived motion judder can be analyzed considering 1) the amount of the pixel motion, 2) edge contrast in the direction of motion, 3) display contrast, 4) display dynamic range adaptation, and/or 5) display size and viewing distance.

In an embodiment, a coding terminal may estimate judder in coded base layer data and may provide metadata to a decoder for use in performing decoder-side FRC. Then the analysis provided by the controller will be used to signal certain hints to assist receiver-side FRC. For example, the hints can include: 1) whether FRC can be skipped; and/or 2) motion vectors, which may be used by the receiving terminal to reduce degradation due to compression artifacts. In the latter case, motion vectors may identify motion of frame content at temporal positions between positions of frames of the base layer data, and/or deviations of motion from the motion that is represented by motion vectors of coded base layer data.

In response to a hint that indicates FRC can be skipped, a decoder may eliminate (or reduce from a default value) an amount of FRC that will be applied in post-processing. Such "skip" hints typically are provided when an encoder determines that, although analysis of decoded video data indicates that judder effects are present, FRC techniques do not improve recovered video quality in a significant manner. In deciding whether to transmit a "skip" hint, the encoder may estimate an amount of processing resources that would be expended on FRC processing and balance the estimated processing cost against an amount of improvement in decoded video; a "skip" hint may be issued if the encoder determines that the processing cost does not meet a threshold amount of quality improvement in the recovered video.

In another embodiment, when the performance of the receiver-side FRC can be characterized, the source-side encoding terminal 200 (FIG. 2) can take advantage of that information and adaptively apply de-juddering techniques while controlling the receiver-side FRC. The encoding terminal 200 may have knowledge of a receiving terminal's capabilities (for example, such information may be exchanged during initiation of the communication link or other handshaking operations). Then the controller 235 at the encoding terminal 200 may estimate the amount, types and quality of FRC performed by the receiving terminal. The controller 235 can use this knowledge to determine how much FRC to perform at the encoding side.

For example, source side FRC can be engaged selectively for certain frames while engaging receiver-side FRC for other frames. In this embodiment, a controller 235 (FIG. 2) may estimate an amount of FRC that a decoder will apply based on its analysis of decoded video data. A video coder 225 ordinarily decodes coded video data for use in developing reference pictures for prediction in motion-compensated prediction operations. For purposes of estimating FRC performance by a decoder, a video coder 225 also may fully decode a portion of coded video that likely will exhibit judder effects and a controller 235 may estimate a decoder's performance of FRC from that decoded video. If the controller 235 determines that decoder FRC operations achieve sufficient mitigation of judder effects, then the controller 235 may determine that source-side FRC is unnecessary. Alternatively, if the controller 235 determines that decoder FRC operations do not sufficiently mitigate judder effects, the controller 235 may induce source-side FRC operations and may code supplementary frames in enhancement layer data, as described above.

An encoding terminal 200 (FIG. 2) also can apply or estimate the effects of the receiver-side FRC and compensate for the resulting artifacts. For example, a controller 235 could engage motion blur to frames on which receiver-side FRC will perform FRC, thereby blurring edges to reduce visible judder in the final results. The motion blur would be performed by the pre-processor 220 in this embodiment. For example, a smoothing filter may be applied with the filter shape adaptive to the local motion. Then additional smoothing may be performed along the direction of the motion, for example by using an orientation-selective filter kernel generated as a result of a signal analysis by the controller.

Additionally, a pre-processor 220 may perform FRC, and interpolated frames may be combined in the co-located dimension, along the direction of motion or a high contrast edge such that the generated sequence is at a lower fps. FRC performed on the averaged, combined frames will generate frames with additional blurring around the high motion, which may reduce judder for sensitive portions of a video sequence.

The controller 235 (FIG. 2) at the encoding terminal 200 may generate additional frames to bring the video sequence up to an intermediate frame rate. Then the receiving terminal can perform the remaining FRC in order to achieve the desired frame rate. This way the controller at the transmitting terminal can prepare a higher quality sequence based on the original source sequence and the receiving terminal can complete the FRC to the desired frame rate using the received, decoded sequence.

In another embodiment, a content creator can provide input or instructions to implement FRC. For example, the content creator may indicate that certain scenes may require additional FRC. The content creator may provide input that controls: 1) the amount of source-side FRC, 2) the amount of receiver-side FRC, or 3) an amount of motion blur to be applied to source data prior to coding. In such an embodiment, a controller 235 may configure a pre-processor 220 to apply the amount of motion blur as identified and to apply FRC as determined by the source-side FRC indications. Moreover, the encoding terminal 200 may include metadata in a coded video signal identifying the mandated amount of receiver-side FRC, which is conveyed to a decoder.

In an embodiment, an encoding terminal 200 (FIG. 2) may code video data for delivery in a store-and-forward manner. That is, a transmitter 230 may develop data streams that contain the coded video data and conform to the syntax of a governing coding protocol, then store those data streams for later delivery. In the case of scalably-coded video, the transmitter 230 may develop a first data stream representing the coded base layer data and a second data stream representing coded enhancement layer data. The transmitter 230 also may store another data stream representing any hints for receiver-side FRC that are developed by the encoding terminal 200. The transmitter 230 may store the coded video and hints for delivery on request from a decoding terminal. For example, the encoding terminal 200 may deliver a base layer data stream to a decoding terminal (not shown) during a video delivery session. The encoding terminal 200 also may determine, for portions of the coded video associated with judder, whether the decoding terminal's FRC capabilities are sufficient to overcome the judder. If the FRC capabilities are estimated to be sufficient, the encoding terminal 200 may not send any supplementary data stream. If the FRC capabilities are estimated to be sufficient but they could be improved through alternative FRC techniques, the encoding terminal 200 may send a supplementary data stream representing the FRC hints. If the FRC capabilities are estimated to be insufficient, the encoding terminal 200 may send a supplementary data stream representing the coded enhancement layer.

The video coder 225 (FIG. 2) may code temporal baselayer frames independently from the enhancement-layer frames. This way the base layer encoding will not be affected by potential artifacts in the interpolated frames. Also, coded base layer data may be sent to a receiver with receiver-side FRC without sending the coded enhancement layer data.

Figure 5:
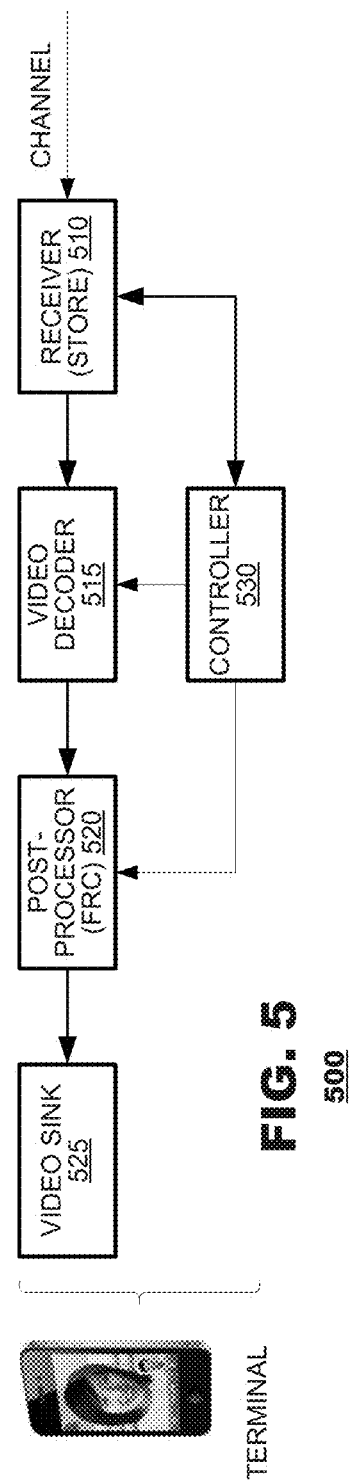
FIG. 5 is a simplified block diagram of a terminal for decoding coded video according to an embodiment of the present disclosure.

FIG. 5 is a simplified block diagram of a terminal 500 for decoding coded video according to an embodiment of the present disclosure. The decoding terminal 500 may include a receiver 510, a video decoder 515, a post-processor 520 and a video sink 525, all operating under control of a controller 530. The receiver 510 may receive and store the coded channel data before processing by the video decoder 515. The video decoder 515 may invert coding and compression processes performed by the encoder (not shown) and may generate recovered video data therefrom. The post-processor 520 may perform signal conditioning operations on the recovered video data from the decoder 515, including frame rate conversion as discussed herein. The video sink 525 may consume recovered video data output by post-processor 520. The controller 530 may manage operations of the decoding terminal 500.

As discussed above, the principles of the present disclosure apply both to unidirectional and bidirectional video coding systems. In a unidirectional coding system, a single terminal 120 (FIG. 1) of a video coding session would include the functionality of FIG. 5. In a bidirectional coding system, each terminal 110, 120 (FIG. 1) of a video coding session would include the functionality of FIG. 5, each operating on independent coded video streams. Indeed, the principles of the present disclosure extend to multi-party video coding sessions of three or more terminals where each terminal (not shown) possesses multiple instances of infrastructure as illustrated in FIG. 5, each to decode a respective coded video stream.

As indicated, the receiver 510 may receive coded video data from a channel. The coded video data may be included with channel data representing other content, such as coded audio data and other metadata. The receiver 510 may parse the channel data into its constituent data streams and may pass the data streams to respective decoders (not shown), including the video decoder 515. The receiver 510 may identify transmission errors in the coded video data that it receives from the channel and, in response, may send error notification messages to the encoder via a return path in the channel.

The video decoder 515 may generate recovered video data from the coded video data. The video decoder 515 may perform prediction and decoding processes. For example, such processes may include entropy decoding, re-quantization and inverse transform operations that may have been applied by the encoding terminal 200. The video decoder 515 may build a reference picture cache to store recovered video data of the reference frames. Prediction processes may retrieve data from the reference picture cache to use for predictive decoding operations for later-received coded frames. The coded video data may include motion vectors or other identifiers that identify locations within previously-stored reference frames that are prediction references for subsequently-received coded video data. Decoding operations may operate according to the coding protocol applied by the encoding terminal 200 and may comply with MPEG-4, H.263, H.264 and/or HEVC.

The post-processor 520 may condition recovered frame data for rendering. As part of its operation, the post-processor 520 may perform frame rate conversion as discussed herein. Optionally, the post-processor 520 may perform other filtering operations to improve image quality of the recovered video data. This may include filtering, de-interlacing, or scaling, de-blocking, sharpening, up-scaling, noise masking, or other post-processing operations.

The video sink 525 represents units within the decoding terminal 500 that may consume recovered video data. In an embodiment, the video sink 525 may be a display device. In other embodiments, however, the video sink 525 may be provided by applications that execute on the decoding terminal 500 that consume video data. Such applications may include, for example, video games and video authoring applications (e.g., editors).

The controller 530 may apply varying levels of control over the receiving side FRC (post-processor 520). For example, the FRC 520 may be switched or turned off. Alternatively, the desired frame rate can adjusted. According to an embodiment, the controller 530 may adjust receiver side FRC 520 based on certain inputs, such as detected motion of the video sequence or other attributes of the video sequence or coding system.

When source-side FRC is used, decoded frames themselves may carry metadata to identify which of the frames are interpolated or generated and which are not. Therefore a bit stream identifier, such as a flag or other notification, or an out-of-band communication may be provided to identify the interpolated frames. The identifier will signal to the display (video sink 525) that the display should not pause or stop on interpolated frames. Then the interpolated frames will avoid screen capture, and only the original frames will be captured/displayed as a still image.

Figure 6:
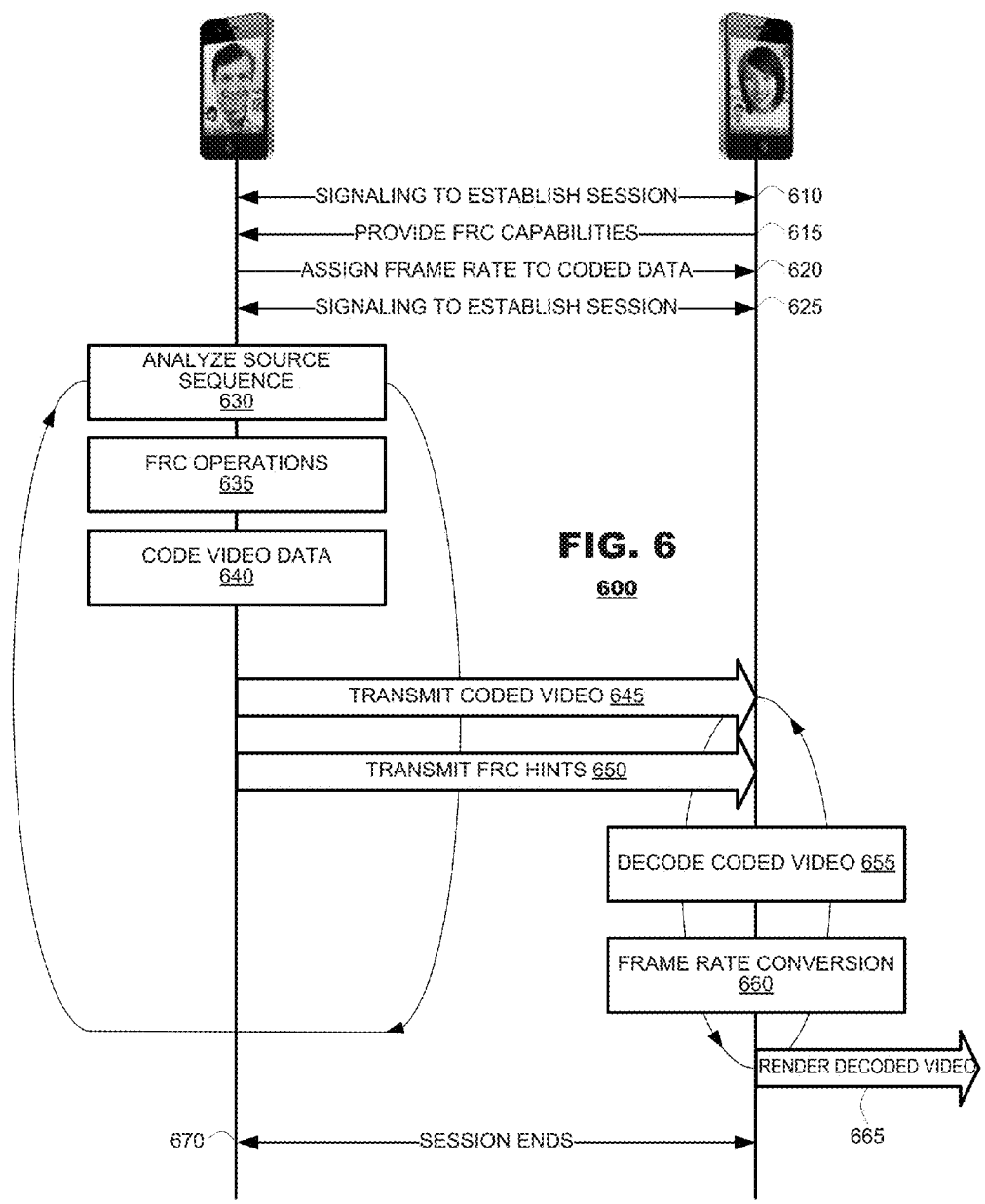
FIG. 6 illustrates communication flow between a pair of terminals according to an embodiment of the present disclosure.

FIG. 6 illustrates communication flow 600 between a pair of terminals according to an embodiment of the present disclosure. The terminals may exchange signaling (arrow 610) to build a communication session between them. As part of this exchange, a decoding terminal may provide signaling (arrow 615) that identifies, to an encoding terminal, the decoding terminal's frame rate conversion capabilities. Based on this information and based on information identifying characteristics of input video, an encoding terminal may assign a frame rate at which input video is to be coded and may communicate this assignment to the decoding terminal (arrow 620). The terminals may exchange other signaling (arrow 625) to complete establishment of the communication session.

The video coding session may proceed. During the session, an encoding terminal may code video for delivery to the decoding terminal. Specifically, the coding terminal may analyze the input video sequence to determine whether FRC operations as described herein are necessary (box 630). For example, the controller may evaluate the source sequence to determine the severity of the potential judder and determine parameters and settings to adapt the FRC of the coding system to the source sequence. According to an embodiment, motion of the source sequence will be evaluated after the sequence has been encoded (not shown).

Thereafter, the encoding terminal may perform any of the FRC operations described herein (box 635). For example, the encoding terminal may perform FRC to generate a sequence at the desired frame rate, may encode the original source sequence as a base layer and the added frames as an enhancement layer, may initiate additional motion blurring, etc. Then the encoding terminal will code the resultant video data at the selected frame rate (box 640). Video coding may exploit spatial and/or temporal redundancy in the resultant video data by, for example, coding according to motion-compensated prediction. The FRC and video coding operations may generate coded base layer and coded enhancement layer data streams, as discussed above.

The encoding terminal may transmit data of the coded frames (arrow 645) and any supplementary data such as coded enhancement layer data or FRC hints (arrow 650) to a decoding terminal. The encoding terminal may provide such data in a supplemental enhancement information (SEI) message under one of those protocols or, alternatively, it may be provided in a communication session that is built outside the confines of the coding protocol to which the encoding terminal and decoding terminal correspond. The encoding terminal may repeat the operations of elements 630-650 until the video session concludes (arrow 670).

The decoding terminal may recover video data during the video coding session. Specifically, the decoding terminal may decode the coded video data that it receives (box 655) by inverting coding operations applied by the encoding terminal. After decoding, the decoding terminal may generate recovered video data. In lossy coding processes, the recovered video data output by the decoding (box 655) may be a replica of the video data coded by the coding operation 640 but with some data loss. The decoding terminal may perform frame rate conversion (box 660) to increase the frame rate of the recovered video data and, in doing so, may apply the received FRC hints that were provided by an encoding terminal in arrow 650. Thereafter, the decoding terminal may render the resultant video data, for example, by presenting the video data on a display device (arrow 665). A decoding terminal may repeat the operations of boxes 645-665 until the video session concludes (box 670).

Although described primarily either as source side or receiver side operations, the provided analysis, blurring, and other FRC optimizations may be provided at either or both terminals.

The techniques described above find application in both hardware- and software-based encoders. In a hardware-based encoder the functional units may be provided in a dedicated circuit system such as a digital signal processor or field programmable logic array or by a general purpose processor. In a software-based encoder, the functional units may be implemented on a personal computer system (commonly, a desktop or laptop computer) executing software routines corresponding to these functional blocks. The program instructions themselves also may be provided in a storage system, such as an electrical, optical or magnetic non-transitory storage medium, and executed by a processor of the computer system. The principles of the present disclosure find application in hybrid systems of mixed hardware and software designs.

Several embodiments of the present disclosure are specifically illustrated and described herein. However, it will be appreciated that modifications and variations of the present disclosure are covered by the above teachings. Other implementations are also within the scope of the present disclosure.

In other instances, well-known operations, components and circuits have not been described in detail so as not to obscure the embodiments. It can be appreciated that the specific structural and functional details disclosed herein may be representative and do not necessarily limit the scope of the embodiments.

We claim:

1. A video coding method, comprising:
   coding a source video sequence as base layer coded video at a first frame rate;
   estimating frame rate conversion operations of a decoding terminal,
   applying estimated frame rate conversion operations of the decoding terminal on decoded base layer data,
   identifying a portion of the decoded base layer data having judder following the application of frame rate conversion operations of the decoding terminal,
   for the identified portion, including a skip hint in coded video data to indicate that a decoder should omit frame rate conversion operations for the respective portion of video data, and
   for the identified portion, coding additional frames of the source video sequence corresponding to the identified portion as coded enhancement layer data, the coded enhancement layer data and the coded base layer data when decoded generating recovered video representing the identified portion at a higher frame rate than the coded based layer data when decoded by itself.

2. The method of claim 1, wherein the additional frames are interpolated from the source video sequence by frame rate conversion.

3. The method of claim 2, further comprising:
   transmitting the coded base layer data and the coded enhancement layer data in a channel; and
   transmitting identifiers of interpolated frames in the channel.

4. The method of claim 1, wherein the source video sequence has a frame rate that exceeds the first frame rate and the additional frames are selected from the source video sequence.

5. The method of claim 1, wherein the source video sequence has a frame rate that matches the first frame rate and the additional frames are interpolated from the source video sequence by frame rate conversion.

6. The method of claim 1, further comprising, prior to the identifying, performing motion blur on the source video sequence.

7. The method of claim 1, wherein the identifying comprises estimating judder effects from display characteristics of a decoding terminal.

8. The method of claim 1, further comprising, when the estimating indicates a portion of video data will be improved by frame rate conversion of the decoding terminal, omitting coding of enhancement layer data for the respective portion.

9. The method of claim 1, further comprising, responsive to a request for the video sequence from a requesting device:
   estimating frame rate conversion operations of the requesting device, and
   selecting, based on the estimated frame rate conversion operations, one of the coded enhancement layer data associated with the video sequence and a set of frame rate conversion hints to be transmitted to the requesting device as supplementary data;

transmitting the coded base layer data associated with the video sequence and the selected supplementary data to the requesting device.

10. The method of claim 1, further comprising, responsive to a request for the video sequence from a requesting device:

estimating frame rate conversion operations of the requesting device, and selecting, based on the estimated frame rate conversion operations, one of the coded enhancement layer data associated with the video sequence and a set of motion vectors associated with temporal positions of frame data generated by frame rate conversion techniques to be transmitted to the requesting device as supplementary data;

transmitting the coded base layer data associated with the video sequence and the selected supplementary data to the requesting device.

11. A computer readable medium storing program instructions that, when executed by a processing device, causes the processing device to:

code a source video sequence as base layer coded video at a first frame rate;

estimate frame rate conversion operations of a decoding terminal, and apply estimated frame rate conversion operations of the decoding terminal on decoded base layer data, identify a portion of the decoded base layer data having judder following the application of frame rate conversion operations of the decoding terminal, and for the identified portion, include a skip hint in coded video data to indicate that a decoder should omit frame rate conversion operations for the respective portion of video data;

for the identified portion, code additional frames of the source video sequence corresponding to the identified portion as coded enhancement layer data, the coded enhancement layer data and the coded base layer data when decoded generating recovered video representing the identified portion at a higher frame rate than the coded based layer data when decoded by itself.

12. The medium of claim 11, wherein the additional frames are interpolated from the source video sequence by frame rate conversion.

13. The medium of claim 11, wherein the program instruction further cause the processing device to:

transmitting the coded base layer data and the coded enhancement layer data in a channel; and transmitting identifiers of interpolated frames in the channel.

14. The medium of claim 11, wherein the source video sequence has a frame rate that exceeds the first frame rate and the additional frames are selected from the source video sequence.

15. The medium of claim 11, wherein the source video sequence has a frame rate that matches the first frame rate and the additional frames are interpolated from the source video sequence by frame rate conversion.

16. The medium of claim 11, wherein the program instruction further cause the processing device to, prior to the identifying, perform motion blur on the source video sequence.

17. The medium of claim 11, wherein the program instruction further cause the processing device to, as part of the identifying, estimate judder effects from display characteristics of a decoding terminal.

18. The medium of claim 11, wherein the program instruction further cause the processing device to, when the estimating and applying indicates a portion of video data will be improved by frame rate conversion of the decoding terminal, omit coding of enhancement layer data for the respective portion.

19. The medium of claim 11, wherein the program instruction further cause the processing device to:

estimate frame rate conversion operations of the requesting device, and select, based on the estimated frame rate conversion operations, one of the coded enhancement layer data associated with the video sequence and a set of frame rate conversion hints to be transmitted to the requesting device as supplementary data;

transmit the coded base layer data associated with the video sequence and the selected supplementary data to the requesting device.

20. The medium of claim 11, wherein the program instruction further cause the processing device to:

estimate frame rate conversion operations of the requesting device, and select, based on the estimated frame rate conversion operations, one of the coded enhancement layer data associated with the video sequence and a set of motion vectors associated with temporal positions of frame data generated by frame rate conversion techniques to be transmitted to the requesting device as supplementary data;

transmit the coded base layer data associated with the video sequence and the selected supplementary data to the requesting device.

21. A video coder, comprising:

a pre-processor selectively employing frame rate conversion on source video, a scalable video coder for coding a portion of source video at a first frame rate as base-layer coded video and a second portion of input video at a second frame rate as enhancement-layer coded video, and a controller with instructions, that when executed by the controller, cause:

estimating frame rate conversion operations of a decoding terminal, applying estimated frame rate conversion operations of the decoding terminal on decoded base layer data, identifying a portion of the decoded base layer data having judder following the application of frame rate conversion operations of the decoding terminal, for the identified portion, including a skip hint in coded video data to indicate that a decoder should omit frame rate conversion operations for the respective portion of video data, and for the identified portion, coding additional frames of the source video sequence corresponding to the identified portion as coded enhancement layer data, the coded enhancement layer data and the coded base layer data when decoded generating recovered video representing the identified portion at a higher frame rate than the coded based layer data when decoded by itself.

22. The method of claim 1, wherein the additional frames include frames interpolated by frame rate conversion from frames of the source video.

23. The method of claim 1, wherein the source video sequence has a frame rate that exceeds the first frame rate and the additional frames are selected from the source video sequence.

24. The method of claim 1, wherein the source video sequence has a frame rate that matches the first frame rate and the additional frames are interpolated from the source video sequence by frame rate conversion.

* * * * *